Jan. 30, 1968  P. E. MERRIMAN  3,365,968
BELT TENSIONING MEANS
Filed June 7, 1965  2 Sheets-Sheet 1
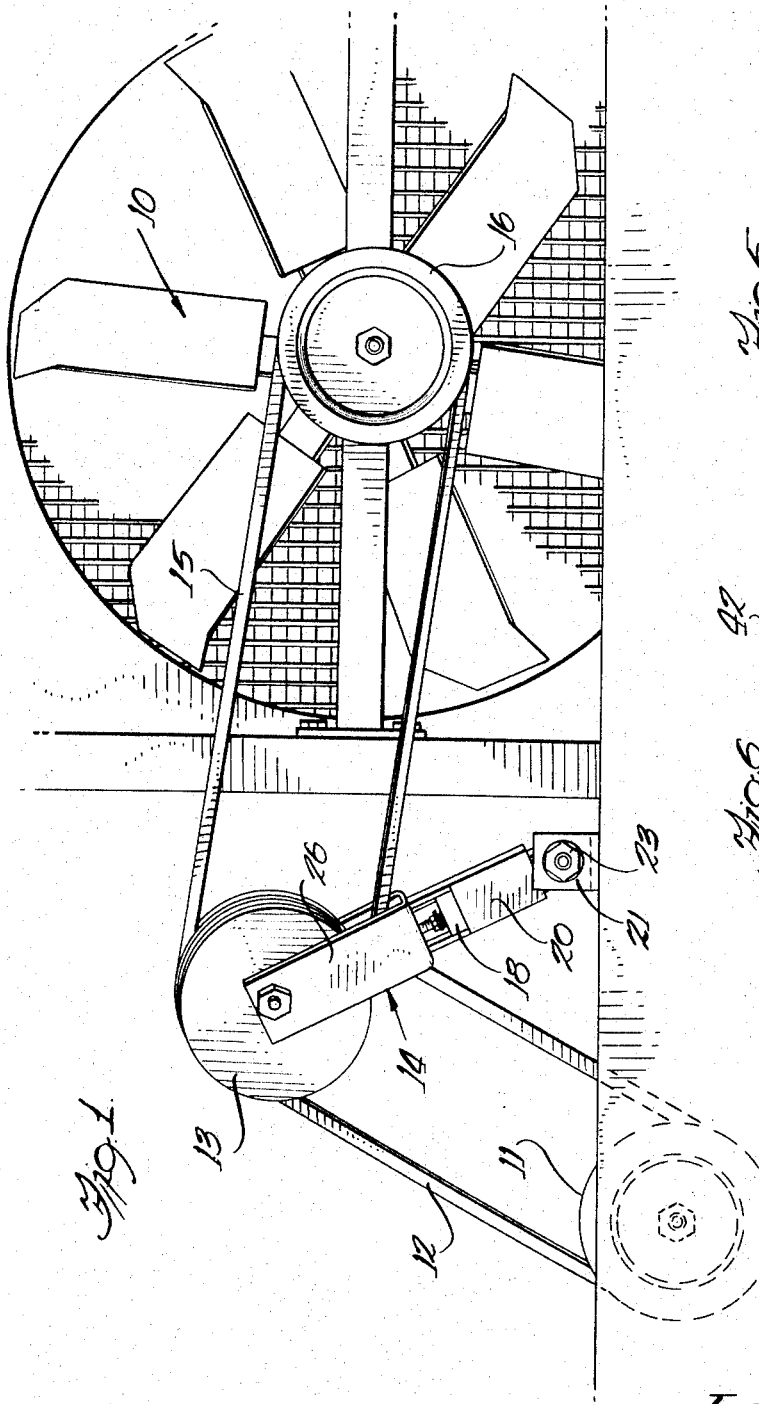
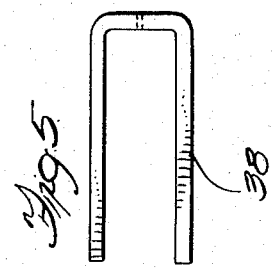
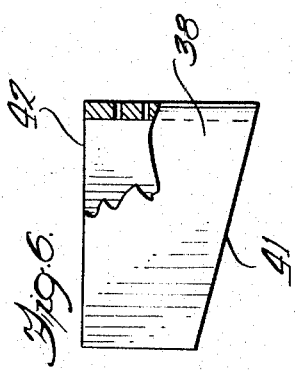
Inventor
Paul E. Merriman
Frederick J. Kubel
Attorney Jan. 30, 1968   P. E. MERRIMAN   3,365,968
BELT TENSIONING MEANS
Filed June 7, 1965   2 Sheets-Sheet 2
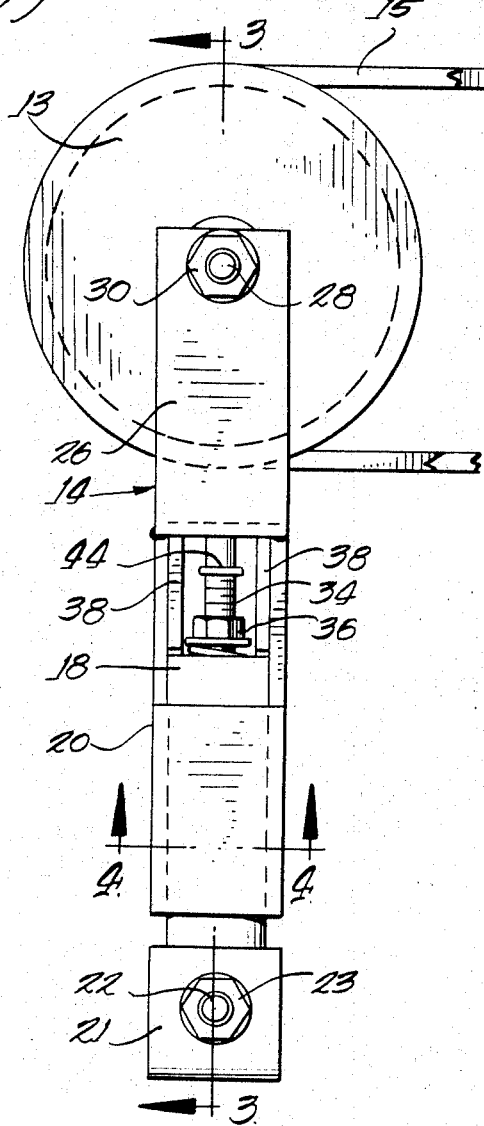
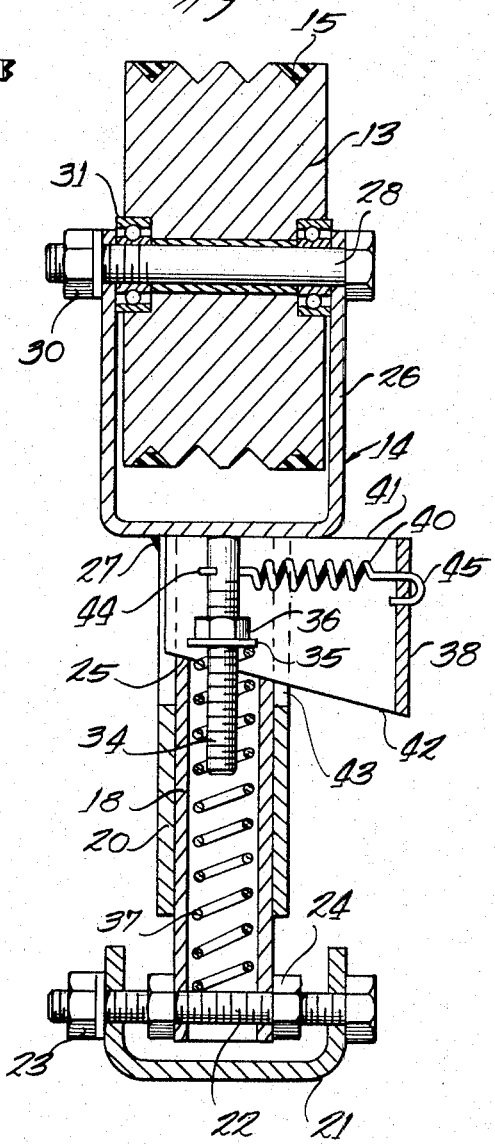
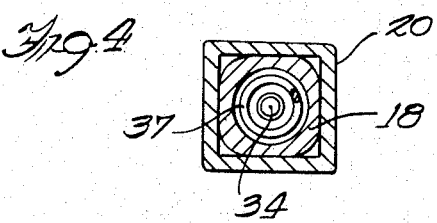
Inventor
Paul E. Merriman
Frederick J. Kubel
Attorney United States Patent Office 3,365,968
Patented Jan. 30, 1968

3,365,968
BELT TENSIONING MEANS
Paul E. Merriman, Fort Wayne, Ind., assignor to International Harvester Company, a corporation of Delaware
Filed June 7, 1965, Ser. No. 461,615
2 Claims. (Cl. 74—242.12)

ABSTRACT OF THE DISCLOSURE

A belt tightening device for automatically taking up slack in a power transmitting belt or chain and for maintaining a predetermined degree of tautness in the belt or chain which includes a pair of telescoping members resiliently urged apart in one direction by means of a spring acting directly on the members and indirectly by means of a spring-pressed wedge-shaped cam member interposed between the telescoping members.

---

The invention relates to belt tighteners and to tension devices for chain and belt power drives and transmission arrangements and has reference in particular to novel and improved belt tensioning devices having spring energized non-return means.

In order to take up the slack in the driving chain or belt of power drives and similar transmission arrangements, tensioning devices have been employed. These devices are spring energized and generally an idler pulley bears against the chain or belt to maintain the same in a taut condition. Although the invention relates to belt tensioning mechanism of this character, one of the main objectives of the invention is to provide non-return means so that vibration and the like will not reverse the progressive action of the tensioning mechanism in holding the belt in a taut condition.

Another object of the invention is to provide an improved belt tensioning device having non-return means in the form of a spring energized cam member carried by the device and effective at all times in preventing any return or retrograde movement of the belt tensioning element of the device.

Another and more specific object of the invention resides in the provision of a belt tensioning device wherein telescoping standards capable of relative movement and spring energized in a direction to take up the slack in a belt drive are combined with a cam member which prevents relative movement of the telescoping standards in a reverse direction, whereby the belt drive is held in a taut condition at all times.

With these and various other objects in view, the invention may consist of certain novel features of construction and operation as will be more fully described and particularly pointed out in the specification, drawings and claims appended thereto.

In the drawings which illustrate an embodiment of the device and wherein like reference characters are used to designate like parts FIGURE 1 is a side elevational view showing a belt drive having combined therewith the belt tensioning mechanism of the present invention;

FIGURE 2 is a side elevational view showing the belt tensioning device as employed for the belt drive of FIGURE 1;

FIGURE 3 is a longitudinal sectional view taken substantially along line 3—3 of FIGURE 2 and showing constructional details of the present belt tensioning device of the invention;

FIGURE 4 is a transverse sectional view taken substantially on line 4—4 of FIGURE 2;

FIGURE 5 is a view in top plan showing the shape of the non-return cam member; and FIGURE 6 is a side elevational view of the non-return cam member as shown in FIGURE 5.

The invention as shown in the drawings is applied to a belt drive for driving the fan 10 of an automotive vehicle. The driving pulley is indicated by numeral 11 and the endless belt 12 operatively connects the driving pulley with the intermediate tensioning pulley 13. The support for the tensioning pulley 13 is indicated in its entirety by the numeral 14 and the drive is continued by the endless belt 15 which operatively connects the tensioning pulley with pulley 16. The pulley 16 constitutes the driven pulley of the arrangement, and the same is mounted on and fixed to the shaft which journals the fan 10 for rotation.

The support 14 is adjustable in a longitudinal direction and when adjusted outwardly the tensioning pulley 13 is caused to take up the slack in both of the driving belts 12 and 15. Thus when the support is urged upwardly and to the left, or in other words, when the support as shown in FIGURE 1 is lengthened, the belt 12 is tensioned as is also the belt 15. However, when the support is reduced in length all tensioning on the belts is lost. The support is, of course, spring energized in an outward direction for tensioning purposes and in combination with such a support the invention provides a non-return cam which prevents any reverse movement of the belt tensioning pulley 13. This structure will now be described.

As best shown in FIGURES 2 and 3 the support essentially consists of an inside tubular standard or pedestal 18 and an outside tubular standard 20. The pedestal and outside standard are relatively movable in a longitudinal direction since standard 20 has telescoping relation with pedestal 18. The standard 20 is approximately square in cross section as shown in FIGURE 4 and although pedestal 18 is also square in cross section, the corners of the same are rounded. The pedestal is pivotally mounted on the frame of the vehicle by means of the bracket 21 which is suitably fixed to the frame and which carries the pivot pin 22. The bracket is apertured for receiving the pivot pin as is also the pedestal and the pin is held to the bracket by the nut 23. The pedestal is centered on the pivot pin by means of the nuts 24.

The upper terminal end of pedestal 18 is indicated by the diagonal edges 25. Thus the outside standard 20 continues the length of the support which includes the yoke or pulley carrier 26 which is welded or otherwise fixed at 27 to the outside standard. The pulley carrier is substantially U-shaped in transverse section and since this element is part of standard 20 the yoke journals the tensioning pulley 13. The side walls of the yoke are apertured for receiving the journalling bolt 28 which is held in place by the nut 30 and the ball bearings 31 mount the pulley 13 on the journalling bolt for substantially frictionless rotation.

The threaded rod 34 depends from the base of the yoke and said rod extends downwardly within and approximately centrally of the pedestal 18. The rod carries the washer 35 which is backed by the threaded nut 36. By adjustment of the threaded nut 36 on the rod 34 the spring action exerted by the coil spring 37 can be varied to suit the particular tension to be applied to the driving belts.

It will be understood that the coil spring exerts sufficient force to take up the slack in both of the driving belts 12 and 15, and to thus maintain said belts in a taut condition. However, due to vibration and other factors, the standard 20 will tend to move downwardly at times to shorten the length of the support, and accordingly all tension on the belts is momentarily lost. To prevent this occurrence the invention provides non-return means which prevents reverse movement of the relatively movable pedestal and standard, the said non-return means taking the form of a cam member 38 which is spring energized by the coil spring 40. The cam member as shown in FIGURE 5 is in the shape of a U, and said member has a tapering formation from right to left, the bottom edge 41 of the member tapering as shown, whereas the top edge 42 is substantially flat and horizontal. The cam member is inserted between the bottom of the pulley carrier 26 and the diagonal edges 25 of the pedestal 18. For accommodating the came member the front and rear walls of the outside standard 20 are provided with slots or openings 43. Thus the outside standard does not interfere with inward movement of the cam member as urged by the coil spring 40. One hooked end 44 of the coil spring 40 engages the depending rod 34 at an intermediate location above the nut 36 and the other hooked end 45 of the coil spring is located in openings in the cam member.

The coil spring 37 is effective in biasing the pulley carrier 26 and thus the tensioning pulley 13 in a direction upwardly and outwardly to take up any slack in the driving belts. The cam member 38 responds immediately to any lengthening of the support for the tensioning pulley by moving inwardly, the cam member being yieldingly biased in this direction and for this purpose by the coil spring 40. Thus the cam member provides non-return means for the pulley 13 and accordingly the driving belts 12 and 15 are held in a taut condition at all times.

The shape of the cam member is such as to facilitate the desired inward movement of this member, since its top edge 41 is flat and horizontal for contact with the undersurface of the pulley carrier 26, and its bottom edge 42 is angled the same as the top edges 25 of the pedestal. Also, the U-shape of the cam member provides adequate space between the side walls of the member for accommodating the coil spring 40.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. A belt tightener comprising, a generally tubular pedestal having one end pivotally connected to a fixed support and its opposite end edge lying in a plane inclined to the longitudinal axis of the pedestal; a generally tubular standard mounted on said pedestal for relative longitudinal sliding movement, one end of said standard being provided with a substantially U-shaped pulley carrier, the bight portion of said carrier being substantially flat and lying in a plane substantially perpendicular to the longitudinal axis of said standard, said standard having slots formed in oppositely facing walls thereof, said slots extending longitudinally from said pulley carrier bight portion; a pulley rotatably supported by side wall portions of said pulley carrier; biasing means for yieldably urging said standard with respect to said pedestal along the longitudinal axes thereof in a direction to increase the overall length of said pedestal and standard including an elongated rod having one end fixed to said pulley carrier bight portion and extending longitudinally within said pedestal, abutment means carried by said rod, and a helically-wound compression spring disposed within said pedestal and having one end reacting against said abutment means; and cam means for assisting the resilient action of said biasing means and for preventing relative movement of said pedestal and standard in a direction to decrease the overall length thereof including a substantially U-shaped cam element, having legs extending through one of said standard wall slots with a respective edge surface of each of said legs slidingly engaging said bight portion of said pulley carrier, each of said legs having an edge surface inclined with respect to said bight portion of said pulley carrier and slidingly engaging said end edge of said pedestal, and a helically-wound tension spring having one end connected to said cam element bight portion and its opposite end connected to said rod.

2. A belt tightener as set forth in claim 1, wherein said rod is provided with screw threads and said abutment means includes a nut threaded on said screw threads, said nut being rotatable with respect to said rod to vary the longitudinal position of said abutment means on said rod to thereby adjust the resilient force exerted by said compression spring.

References Cited

UNITED STATES PATENTS

| | | | |
|---|---|---|---|
| 1,578,531 | 3/1926 | Laganke | 74—242.14 |
| 1,783,987 | 12/1930 | Thompson | 74—242.11 |
| 2,401,670 | 6/1946 | Spetz | 74—242.8 |
| 3,062,066 | 11/1962 | Mohr | 74—242.11 |
| 3,217,612 | 11/1965 | Graham | 74—242.14 |

FRED C. MATTERN, Jr., *Primary Examiner.*

DAVID J. WILLIAMOWSKY, *Examiner.*

J. A. WONG, *Assistant Examiner.*